United States Patent [19]

Grobecker et al.

[11] Patent Number: 4,874,085
[45] Date of Patent: Oct. 17, 1989

[54] STORAGE CASSETTE FOR HIGH STORAGE DENSITY, DISC-SHAPED INFORMATION CARRIERS

[75] Inventors: Hermann Grobecker, Garbsen; Werner Heher, Lehrte; Adelbert Zielasek, Burgwedel, all of Fed. Rep. of Germany; Frederik B. Nusselder, Bussum, Netherlands

[73] Assignee: Polygram GmbH, New York, N.Y.

[21] Appl. No.: 259,554

[22] Filed: Oct. 18, 1988

Related U.S. Application Data

[60] Division of Ser. No. 145,749, Jan. 19, 1988, abandoned, which is a continuation of Ser. No. 829,062, Feb. 13, 1986, abandoned, which is a division of Ser. No. 459,232, Jan. 19, 1983, abandoned.

[30] Foreign Application Priority Data

Feb. 16, 1982 [DE] Fed. Rep. of Germany ....... 3205478

[51] Int. Cl.$^4$ ............................................... B65D 85/30
[52] U.S. Cl. ..................................... 206/309; 206/310; 206/311; 206/312; 206/444
[58] Field of Search ............... 206/303, 310, 311, 312, 206/387, 444, 309; 220/307, 334, 339, 341; 312/10, 12; 360/133

[56] References Cited

U.S. PATENT DOCUMENTS

| | | | |
|---|---|---|---|
| 1,255,690 | 2/1918 | Barlow | 206/310 |
| 3,109,539 | 11/1963 | Turoff | 206/310 |
| 3,381,916 | 5/1968 | Edgell | 220/339 |
| 3,530,981 | 12/1968 | Wienecke, Jr. | 220/307 |
| 3,825,112 | 7/1974 | Schumaker et al. | 206/310 |
| 3,904,033 | 9/1975 | Haerr | 220/339 |
| 3,907,193 | 9/1975 | Heller | 220/339 |
| 3,949,872 | 4/1976 | Paudras | 206/310 |
| 4,049,119 | 9/1977 | Wilson | 206/387 |
| 4,205,762 | 6/1980 | Wolfseder | 220/334 |
| 4,231,474 | 11/1980 | Takahashi | 206/387 |
| 4,235,334 | 11/1980 | Ahn | 206/387 |
| 4,327,831 | 5/1982 | Inaba et al. | 206/310 |
| 4,499,996 | 2/1985 | Coyle | 206/444 |

FOREIGN PATENT DOCUMENTS

| 3027804 | 2/1985 | Fed. Rep. of Germany | 206/303 |
|---|---|---|---|
| 427141 | 4/1935 | United Kingdom | 206/310 |

Primary Examiner—David T. Fidei
Attorney, Agent, or Firm—David R. Treacy

[57] ABSTRACT

High storage density information carriers, particularly optically readable video discs and digital records, can only be read error-free by a playback device when the high requirements made of freedom from warping also remain guaranteed over long storage times. A cassette is provided to support and fix an information carrier only within its central portion which is free of information tracks and, by a sufficient spacing of the information carrier in the support-free area between a bottom portion and a cover portion contact with the information carrier in this area is avoided, even given consideration of maximally-admissible warping tolerances of the storage cassette and of the information carrier.

9 Claims, 7 Drawing Sheets

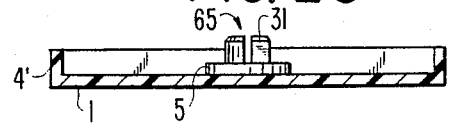
FIG. 23
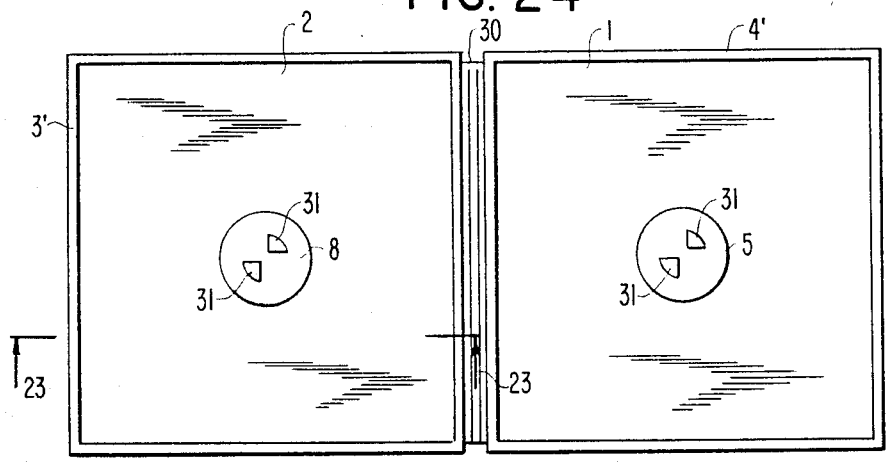
FIG. 24
FIG. 25
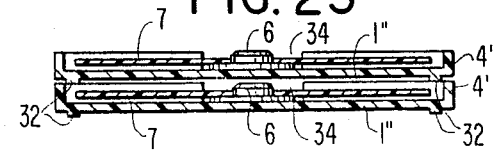
FIG. 26
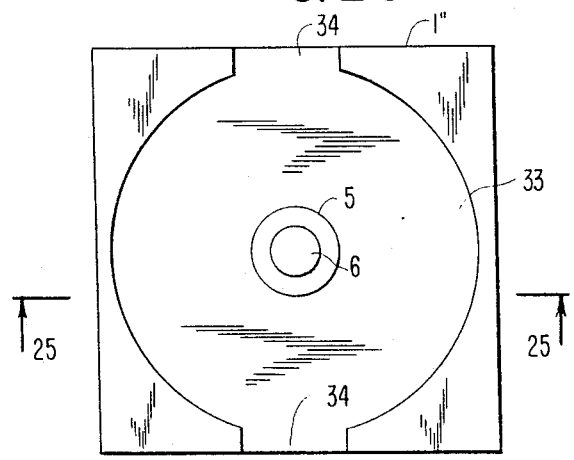

STORAGE CASSETTE FOR HIGH STORAGE DENSITY, DISC-SHAPED INFORMATION CARRIERS

This is a division of application Ser. No. 07/145,749, filed Jan. 19, 1988 which in turn was a continuation of 06/829,062, filed Feb. 13, 1986, which was a divisional of 06/459,232, filed Jan. 19, 1983 all abandoned.

BACKGROUND OF THE INVENTION

1. Field of the Invention

The present invention relates to a storage container or cassette comprising a flat, box-shaped bottom portion and a removable or, respectively, hinged cover portion closing the bottom portion at its upper side.

2. Description of the Prior Art

Cassettes (containers) comprising cardboard or synthetic material, such as, preferably provided for storing normal records are usually unsuitable for storing disc-shaped information carriers having high storage density such as, for example, an optically-readable video disc or an optically-readable digital record. Although such a storage cassette fundamentally offers a certain protection against damage to the contents thereof, a sufficient protection against warping cannot thereby be met due to high requirements made of freedom from warping. Apart from the fact that the information carrier must be stored flat in the cassette, it must also be seen to that a potential warping of the cassette is not transferred to the disc carried within the cassette.

In order to guarantee the storage properties to be required for such disc-shaped information carriers having high storage density, it has already been proposed in the German patent application P 31 40 146.5, fully incorporated herein by this reference, to provide a hinged container in the manner of a cassette acceptance container for a magnetic tape cassette into which the actual disc container is inserted.

SUMMARY OF THE INVENTION

The object of the present invention is to provide a further solution for a storage container of the type initially mentioned above which also allows the information carrier to be stored in single or simple containers.

Beginning with a storage cassette consisting of at least a flat box-shaped bottom portion and a removable or, respectively, hingeable cover portion closing the bottom portion at its upper side, the above object is achieved, according to the present invention, in that, for the purpose of storing disc-shaped information carriers with high storage density, particularly digital records, the bottom of the bottom portion comprises a rest which is elevated over the actual bottom surface for storage of the information carrier only in the center area which is free of information tracks, the rest exhibiting a central peg arrangement extending over the upper side of the rest. The peg arrangement is matched to the diameter of the center hole of the information carrier and engages into the center hole in the deposited condition of the information carrier.

The present invention is based on the essential perception that optimum security against warping of an information carrier is provided in that the information carrier is seated in the storage cassette only in the center area which is free of information tracks, i.e. the outer disc area including the area which exhibits information track spirals floats free.

Advantageously, the distance of the deposited information carrier to the cassette bottom and to the cassette cover in the area outside of the rest area is dimensioned in such a manner that contact of the information carrier to the bottom portion and/or the cover portion is to be avoided even given consideration of the maximally-admissible warping tolerances of both the information carrier and of the cassette housing.

Fixing the information carrier deposited in the cassette can be initiated by a suitable design or, respectively, by way of resilient properties of the peg arrangement.

A further advantageous possibility for fixing the deposited information carrier in the cassette comprises providing a further elevated rest at the inside of the cover portion, the further elevated rest being dimensioned in such a manner that the information carrier, in the closed condition of the cassette, is clamped between both rests in its central area.

The elevated rest in the bottom portion and, if necessary, in the cover portion can be shaped in various manners.

Basically, the bottom portion and the cover portion can be separated from one another. In this case, mutually-assigned edge-side recesses and projections are to be provided at the bottom portion and at the cover solely for their mutual fixing in their joined condition. However, it is meaningful for various purposes of use to permanently connect the bottom portion and the cover portion to one another one side by way of a hinge.

It is also meaningful for easier manipulation, given insertion of the information carrier into and removed from the cassette, to provide recesses for grasping the information carrier in the bottom portion at both sides of the central area.

In accordance with a further feature of the invention, for a more demanding packaging requirement, the bottom portion and the cover portion can represent a pallet, accepting the information carrier, the pallet, if necessary together with a text supplement, being placed or inserted in a box-shaped container.

In accordance with a further feature of the invention, wherein the bottom portion and the cover portion can be separated from one another and are mutually fixable only by way of mutually-assigned, edge-side recesses and projections, the bottom portion with the information carrier deposited therein is designed as a stackable pallet.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 23 is a sectional view of a storage cassette;

FIG. 24 is a plan view of an open storage container for a storage cassette in accordance with FIG. 23;

FIG. 25 is a sectional view of a stackable storage cassette; and

FIG. 26 is a plan view of a stackable storage cassette in accordance with FIG. 25.

DESCRIPTION OF THE PREFERRED EMBODIMENTS

Figure 1:
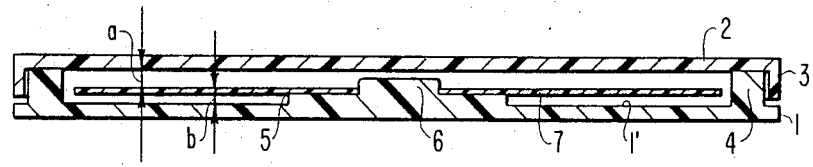
FIG. 1 is a sectional view of a first embodiment of a storage container or cassette constructed in accordance with the present invention.

A storage container or cassette is illustrated, in section, in FIG. 1 and comprises a bottom portion 1 which is expanded into a closed housing having the cover portion 2 at its upper side. With an elevated edge 3, the cover portion 2 thereby engages over a sidewall 4 of the bottom portion 1. In its central area, the bottom portion 1 comprises an elevated rest 5 having a circular shape which, in turn, merges into a peg 6 at its center. A disc-shaped information carrier 7, representing a digital record, is deposited on the elevated rest 5, the peg 6 engaging into a center hole of the information carrier. With respect to its diameter, the circular peg 6 is dimensioned such that the information carrier 7 is easily received over the peg 6 when it is deposited on the rest 5 and, therefore, is fixed in such deposit. A seating surface of the elevated rest 5 is dimensioned in such a manner that the disc-shaped information carrier rests on the elevated rest only with its center portion free of information tracks. Other seating is not provided so that the information carrier in the storage cassette is free of support across the information track area up to its outer edge.

The distances a and b of the information carrier 7 in the support-free area between the cover portion 2, on the one hand, and the bottom surface 1' of the bottom portion 1, on the other hand, are selected in such a manner that contact of the information carrier 7 in the support-free area with the bottom portion and/or the cover portion is to be avoided, even given consideration of maximally-admissible warping tolerances of both the information carrier and the cassette housing.

Because, as shown in FIG. 1, the peg 6 extends beyond the information carrier 7, and as described above the carrier 7 is fixed upon deposit on the rest 5, it is clear that the peg and rest together form the sole retention of the carrier. As a result the information area and peripheral edge are free of contact with the container independent of the orientation of the container. In this embodiment the cover 2, which as shown is clear above the free end of the peg 6, never contacts the carrier 7 when the carrier is fixed in its deposited position on the rest 5.

Figure 2:
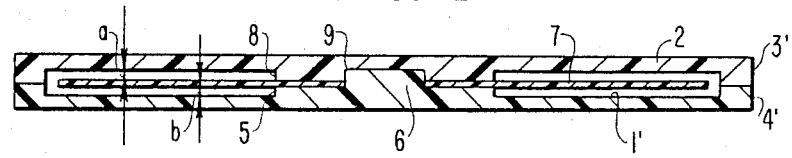
FIG. 2 is a sectional view of a second embodiment of a storage cassette constructed in accordance with the present invention.

Referring to FIG. 2, the storage cassette, likewise illustrated in section, shows a modification of the embodiment according to FIG. 1, insofar as the fixation of the information carrier 7 deposited on the elevated rest 5 of the bottom portion 1 does not occur in the peg 6. The fixing here occurs in that a further elevated rest 8 is provided at the inside of the cover portion, the further rest 8 being matched to the dimensions of the elevated rest 5 and exhibiting a central recess 9 into which the peg 6 engages in the closed condition of the storage cassette. In other words, the information carrier 7 is seized between the two elevated rests 5 and 8.

Differing from the embodiment according to FIG. 1, the bottom portion 1 and the cover portion 2 in FIG. 2 are identically designed at their edges and respectively exhibit circumferential, elevated edges 3' and 4' which are directly adjacent to one another at their end faces. As a result of the identical execution of the profiles of the bottom portion 1 and the cover portion 2 at the peripheries thereof, the distances a and b between the information carrier 7 in the support-free area are of identical size between the cover portion 2, on the one hand, and the bottom portion 1, on the other hand.

Figure 3:
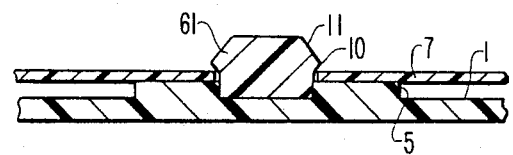
FIG. 3 is a sectional view of a first embodiment of a peg arrangement.
Figure 4:
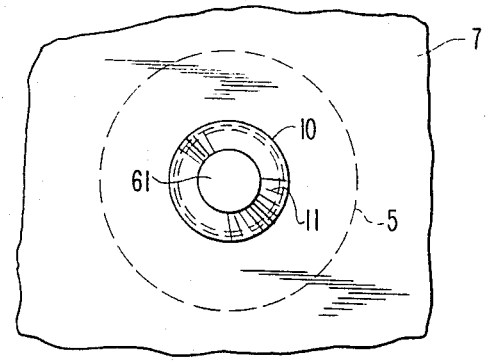
FIG. 4 is a plan view of the arrangement of FIG. 3.

Given the embodiment of the peg arrangement illustrated in section and in a plan view in FIGS. 3 and 4, respectively, the peg arrangement comprises a peg 61 of a suitable elastic material. The peg 61 is received in the bottom portion 1, namely into the elevated rest 5, and comprises an annular nose-shaped spring catch profile 10 for fixing the information carrier on the elevated rest 5. Above the spring catch profile 10, the peg develops into a cone 11. The spring catch profile 10 represents a spring catch over which the information carrier is to be deposited engages in its desired position on the elevated rest 5.

Figure 5:
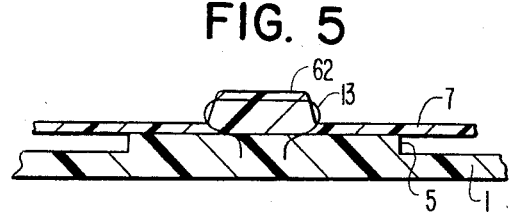
FIG. 5 is a sectional view of a second embodiment of a peg arrangement according to the present invention.
Figure 6:
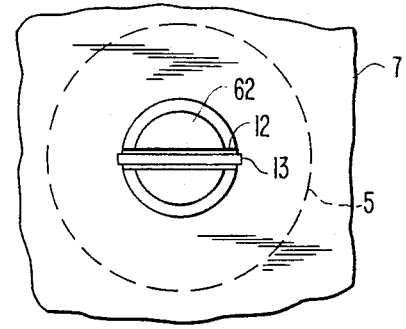
FIG. 6 is a plan view of the peg arrangement of FIG. 5.

A further embodiment of the peg arrangement is illustrated in a sectional view and in a plan view in FIGS. 5 and 6, respectively. Here, the peg arrangement comprises a peg 62 which terminates conically towards its free upper end and having a vertical slot 12 which receives a spring buckle 13 which is let into the bottom portion 1. The spring buckle 13 projects beyond the circumferential surface at both sides of the peg 62 and therefore forms a spring catch over which the information carrier 7 is fixed on the rest 5.

Figure 7:
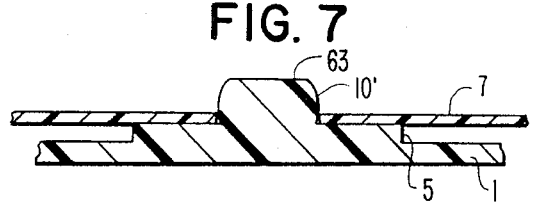
FIG. 7 is a sectional view of a third embodiment of the peg arrangement in accordance with the present invention.
Figure 8:
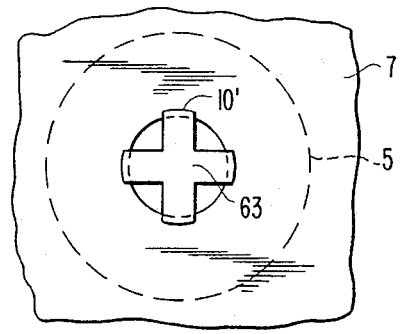
FIG. 8 is a plan view of the peg arrangement of FIG. 7.

In an embodiment of a peg arrangement according to FIGS. 7 and 8, also shown in a sectional view and in a plan view, wherein the information carrier 7 is fixed on the rest 5 over a peg exhibiting spring properties, the peg arrangement again comprises a peg 63 which includes a barrel-shaped spring catch profile 10' and, as illustrated in the plan view of FIG. 8, comprises the shape of a cross with arms extending perpendicular to its vertical axis. This cross-shaped construction increases the spring properties of the material and makes it possible to immediately produce the peg 63 during manufacture of the bottom portion and in one manufacturing step therewith.

Figure 9:
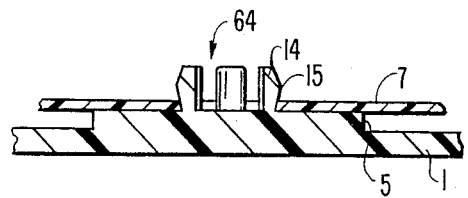
FIG. 9 is a sectional view of a fourth embodiment of a peg arrangement in accordance with the present invention.
Figure 10:
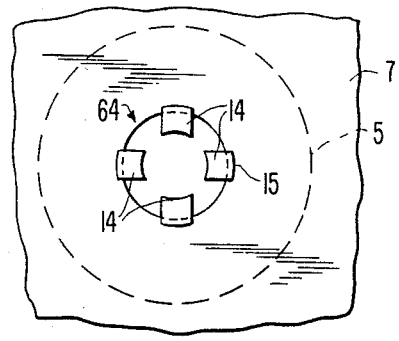
FIG. 10 is a plan view of the peg arrangement of FIG. 9.

A modification of the embodiment according to FIGS. 7 and 8 is shown, again in a sectional view and in a plan view, in FIGS. 9 and 10. Here, the peg arrangement 64 comprises a plurality of spring elements 14 constructed in the manner of an axially-slotted spring chamber. For a positive lock engagement of the peg arrangement in the center hole of the information carrier 7, the spring elements 14 exhibit a spring catch profile 15 at their exterior sides. Here, also, it is possible to produce the bottom portion 1 together with the elevated rest 5 and the peg arrangement 64 in a single manufacturing operation.

Figure 11:
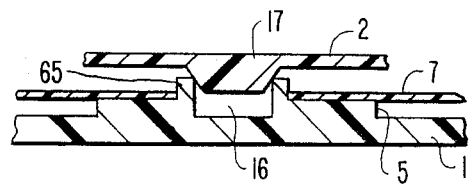
FIG. 11 is a sectional view of a fifth embodiment of a peg arrangement, according to the present invention, having a spreader cone at the cover side.

The sectional view of FIG. 11 illustrates a further possibility for fixing the information carrier to be deposited on the elevated rest 5 in the bottom portion 1 over a peg arrangement. Here, the peg arrangement 65 comprises a ring segment having a central opening 16 extending downwardly below the seating surface of the elevated rest 5. Clamping the annular segments against the inner wall of the center hole of the information carrier 7 located on the elevated rest 5 occurs by way of a spreader cone 17 provided at the inside of the cover portion 2 which engages into the central opening 16 of the ring segment in the closed condition of the storage cassette thereby flexing the ring so that its outer surface firmly engages the inner surface of the central hole of the information carrier.

Figure 12:
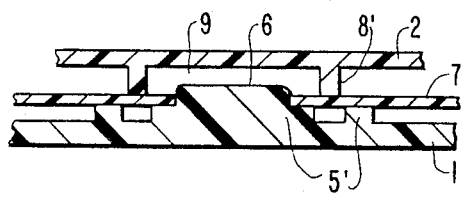
FIG. 12 is a sectional view of the central portion of the storage cassette, constructed in accordance with the present invention, wherein the inserted information carrier is fixed between elevated rests at the cover side and the bottom side.

In the exemplary embodiments discussed so far, the elevated rest 5 in the bottom portion 1 and, under certain conditions, the elevated rest in the cover portion had the shape of the circular disc. This, however, is not absolutely necessary. In all instances, the elevated rest can also be a ridge or, respectively, pin pattern limited to the circular surface, this being particularly advantageous where material savings are desired. Such a modified embodiment of an elevated rest in the bottom portion 1 and one in the cover portion 2 according to the embodiment described in conjunction with FIG. 2 is illustrated in FIG. 12. The elevated rest 8' on the interior of the cover portion 2 here comprises an annular ridge. The elevated rest 5' in the bottom portion 1, in turn, exhibits a center portion shaped like a ring or wheel with a peg 6 rising thereabove and an annular ridge disposed concentrically thereto. Fixing the information carrier 7 occurs as in FIG. 2 by clamping the information carrier 7 between the elevated rest 8' and 5' at the cover side and at the bottom side. It is readily apparent that a material-saving design of these elevated rest in the cover portion and in the bottom portion can also be realized in the same manner by structures of other annular ridge or pin patterns.

Figure 13:
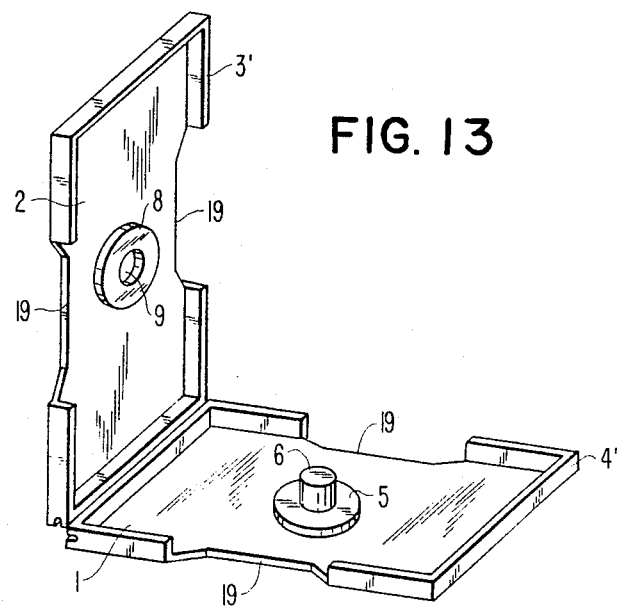
FIG. 13 is a perspective view of a pallet structure for a storage cassette in which the inserted information carrier is fixed between elevated rests at the bottom side and the cover side.
Figure 14:
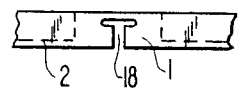
FIG. 14 illustrates a hinged structure of the storage cassette according to FIG. 13.

FIG. 13 illustrates a pallet embodiment of a storage cassette according to FIG. 2 in a perspective view wherein the cover portion 2 having the elevated ring or wheel-like rest 8 and the bottom portion 1 having the disc-shaped, elevated rest 5 and peg 6 rising thereabove are connected to one another on one side by a hinge structure. As indicated in FIG. 13 and shown by way of detail in FIG. 14, the single-side connection in the transition area between the bottom portion 1 and the cover portion 2 is designed as a strap hinge. Here, the strap hinge is realized, for example, by a T-shaped groove 18. Further, both the bottom portion and the cover portion exhibit trapezoidal recesses 19 in their central areas which facilitate the insertion and removal of the information carrier. If necessary, the trapezoidal recesses 19 in the cover portion may be eliminated.

Figure 15:
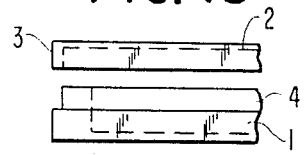
FIG. 15 is a fragmentary illustration of a possibility for fixing between the bottom portion and the cover portion.
Figure 16:
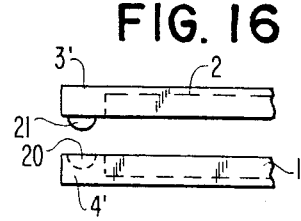
FIG. 16 is a fragmentary illustration of a fixing possibility between the bottom portion and the cover portion.

Of course, the bottom portion 1 and the cover portion 2 can also be completely separate from one another. In this case, however, measures must be provided in order to be able to guarantee a mutual fixing of the bottom portion and the cover portion when closing the storage cassette. In a sectional view, FIG. 15 illustrates a fixation structure wherein the outer edge 3 of the cover portion 2 engages over the wall 4 of the bottom portion 1 which is stepped toward the inside, as is also the case given the embodiment according to FIG. 1. In the embodiment according to FIG. 2, wherein the edge portions at the bottom and cover portions rest flat against one another, ball-like recesses 20 may be provided for fixing in the end face of the edge 4' of the bottom portion 1, as illustrated, for example, in FIG. 16, into which hemispherical projections 21 attached to the end face 3' of the cover portion 2 in a corresponding manner engage.

Figure 17:
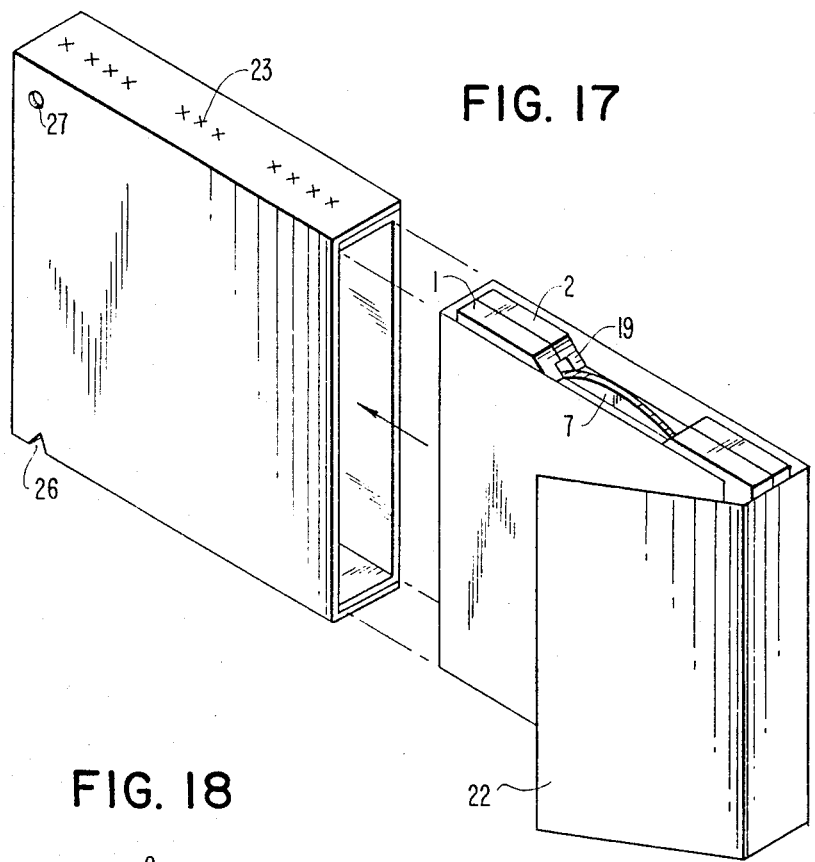
FIG. 17 is a perspective view of a storage cassette constructed as a double container.

The pallet embodiment of the storage cassette according to FIG. 13, for designing a more demanding packaging surrounded by a supplement 22 as shown in FIG. 17, can be inserted into a box-like container 23. The box-like container 23 can be labeled or printed on all sides. However, it can also comprise a transparent synthetic material which exhibits printing only in the area of its narrow sides and leaves a view of the printed supplement 22 free elsewhere. As indicated, the printed supplement 22 may be a simple folded structure about the cassette. In case the box-like container 23 is labeled or, respectively, printed, a printed supplement may be omitted.

Figure 18:
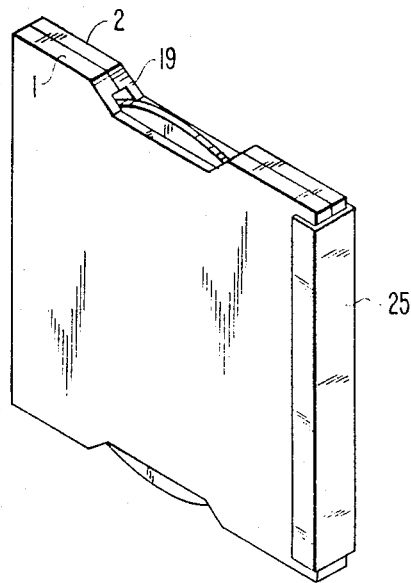
FIG. 18 is a perspective illustration of a pallet of the double container of FIG. 17.
Figure 19:
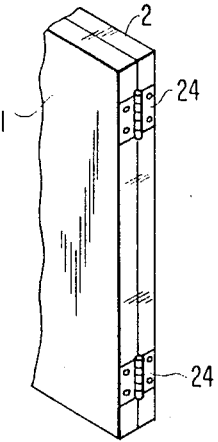
FIG. 19 illustrates a hinged section of a pallet of the double container according to FIG. 17.

Given the pallet according to FIG. 18, the bottom portion 1 and the cover portion 2 are connected to one another at one side by way of an adhesive strip consisting of synthetic film or fabric representing a hinge strap 25. In a modification illustrated in detail in FIG. 19, the hingeable, single-sided connection of the bottom portion 1 and the cover portion 2 occurs with the assistance of two hinges 24.

Figure 22:
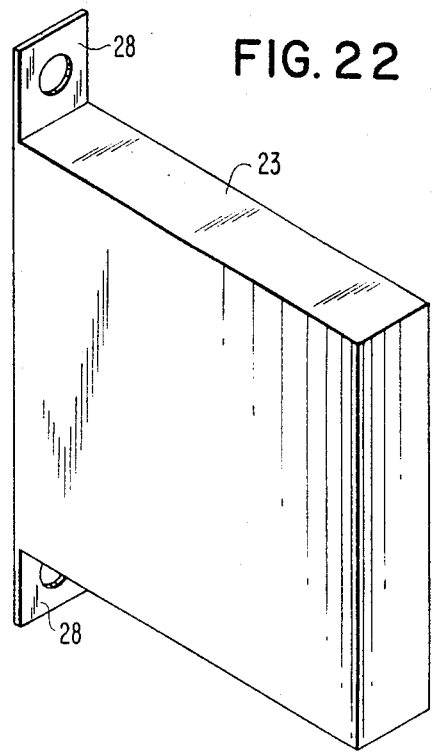
FIG. 22 illustrates a variation of the box-shaped container of the double container constructed in accordance with FIG. 17.

As FIG. 17 also illustrates, the box-like container 23 can comprise a recess 26 or, respectively, a bore 27 at its rear end with whose assistance it is possible to secure such a two-container arrangement against theft in a sales stand. A further variation for such theft protection, in conjunction with a box-like container 23, is illustrated in FIG. 22 wherein the container comprises flange-like, perforate tabs 28 at one end thereof.

Figure 20:
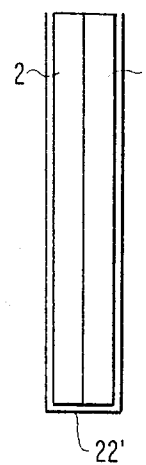
FIG. 20 is a side view of a pallet of the double container of FIG. 17, having a text supplement.

Whereas, in the embodiment according to FIG. 17, the supplement 22 completely surrounds the pallet, and, in addition, also exhibits a cover, a supplement 22' which only surrounds the pallet at three sides is provided according to FIG. 20.

Figure 21:
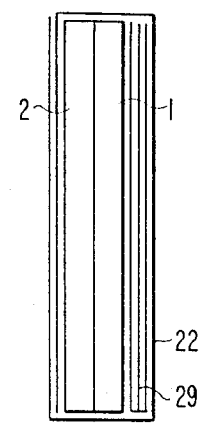
FIG. 21 is a side view of a further pallet of the double container according to FIG. 17, illustrating a test supplement and text cover.

The execution of the storage cassette in the form of a two-container arrangement according to FIG. 17 is particularly meaningful when the information carrier is to be provided with text, such as a brochure. In accordance with the embodiment according to FIG. 21, the text supplement 29 is placed with the pallet and the pallet and the supplement are surrounded by a supplementary sheet 22 in accordance with the embodiment according to FIG. 17. The packet formed in this manner is then inserted into a box-like container 23 in accordance with FIG. 17.

FIGS. 23 and 24 illustrate a further embodiment of a storage cassette or, respectively, a pallet wherein the bottom portion 1 and the cover portion 2 are permanently connected to one another at one side by a strap hinge 30. As the sectional view of the bottom portion according to FIG. 23 and the plan view of the bottom portion and the cover portion according to FIG. 24 illustrate, the peg arrangement 66 comprises four pin-like elements 31 having a sector-shaped cross section, of which two mutually opposite elements are disposed on the elevated rest 5 of the bottom portion 1 and the elevated rest 8 of the inside of the cover portion 2. Here, the elements 31 of the peg arrangement 66 disposed on the elevated rest 8 only engage, so to speak, in the center hole of the information carrier deposited on the elevated rest 5 of the bottom portion when the bottom portion and cover portion are folded together. Simultaneously, the information carrier is thereby fixed by being clamped between the elevated rests.

Given the use of separate bottom portions 1 and cover portions 2, as illustrated in section in FIG. 25 and in a plan view in FIG. 26, there is the possibility of executing the bottom portions 1 to be stackable and, by so doing, to also employ the same for transport purposes within the framework of the information carrier manufacture. To this end, the bottom portions 1 exhibit edge-side projections at the bottom side which are set back from the edge towards the inside by the width of a sidewall 4' and which engage in the respective bottom portion lying therebelow.

These projections 32, of course, are executed such that they do not come into contact with the information carrier 7 deposited in the bottom portion disposed therebelow.

As the plan view of such a stackable pallet bottom portion illustrates, the bottom portion basically comprises a plate 1" which includes a recess 33 for receiving the information carrier 7. The recess 33 is extended toward opposite edges to provide grasping openings 34. Instead of grasping openings, gripping depressions or recesses can be also provided in the areas of two diagonally-opposite corners.

The bottom portion 1 and the cover portion 2, as well as the box-like container 23, can be manufactured in a standard manner by pressing, injection, deep-drawing, or molded foaming of synthetics. Manufacture on the basis of cardboard is also possible. Given a two-container embodiment, i.e. when the bottom portion and the cover portion have the function of a pallet, the execution of the bottom portion and of the cover portion is advantageously manufactured of a soft, but inherently rigid, molded foam since, in this manner, the pallet, of course, receives its actual protection against damage due to the introduction thereof into the box-shaped container.

Although we have described our invention by reference to particular illustrative embodiments thereof many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A storage container for an information record having a peripheral edge; an information area adjacent the peripheral edge carrying information tracks; and a central area adjacent the information area, said central area being free of information tracks and having a central hole having an inner surface, said container comprising a box-like bottom and a cover, said bottom having an inside bottom surface, edge means extending from said bottom surface and defining an open top, an elevated rest carried by said bottom surface, said elevated rest having a substantially planar surface for receiving and supporting an information record placed in the container only in its central area, and a central peg arrangement carried by said rest for engaging the inner surface of the central hole, in a closed condition of the container said cover extending between said edge means and closing said top, and said central peg arrangement and elevated rest together forming a sole means for retaining the information carrier in such position with respect to the container that the record information area and the peripheral edge are free of contact with the container, independent of the orientation of the container.

2. A container as claimed in claim 1, wherein said means for retaining includes a portion of said peg arrangement arranged to overhang a part of said central area for holding the information record central area substantially in contact with said substantially planar surface.

3. A container as claimed in claim 2, wherein at least said portion of said peg is resilient in a radial direction parallel to said substantially planar surface.

4. A container as claimed in claim 3, further comprising hinge means for joining said bottom and said over.

5. A storage container for an information record having a peripheral edge; an information area adjacent the peripheral edge carrying information tracks; and a central area adjacent the information area, said central area being free of information tracks and having a central hole having an inner surface, said container comprising a box-like bottom and a cover, said bottom having an inside bottom surface, edge means extending from said bottom surface and defining an open top, an elevated rest carried by said bottom surface, said elevated rest having a substantially planar surface for receiving and supporting an information record placed in the container only in its central area, and a central peg arrangement consisting of a plurality of flexible fingers carried by said rest for engaging the inner surface of the central hole a portion of each of said fingers overhanging said central area of said information record, in a closed condition of the container said cover extending between said edge means and closing said top, and said central peg arrangement and elevated rest together forming a sole means for retaining the information carrier in such position with respect to the container that the record information area and the peripheral edge are free of contact with the container, independent of the orientation of the container.

6. A container as claimed in claim 5, wherein said fingers are flexible in a radial direction only, parallel to said substantially planar surface.

7. A container as claimed in claim 6, further comprising hinge means for joining said bottom and said over.

8. A storage container for an information record having a peripheral edge; an information area adjacent the peripheral edge carrying information tracks; and a central area adjacent the information area, said central area being free of information tracks and having a central hole having an inner surface, said container comprising a box-like bottom and a cover, said bottom having an inside bottom surface, edge means extending from said bottom surface and defining an open top, an elevated rest carried by said bottom surface, said elevated rest having a substantially planar surface for receiving and supporting an information record placed in the container only in its central area, and a central peg arrangement consisting of a plurality of flexible fingers carried by said rest for engaging the inner surface of the central hole, a portion of each of said fingers overhanging said central area of said information record.

in a closed condition of the container said cover extending between said edge means and closing said top, and said central peg arrangement elevated rest together forming a sole means for retaining the information carrier in such position with respect to the container that the record information area and the peripheral edge are free of contact with the container, and the information record is entirely free from contact with said cover, independent of the orientation of the container.

9. A container as claimed in claim 8, further comprising hinge means for joining said bottom and said over.

* * * * *